United States Patent

[11] 3,578,345

| [72] | Inventor | John C. Copes |
| | | 2750 McConnell Drive, Baton Rouge, La. 70809 |
| [21] | Appl. No. | 804,044 |
| [22] | Filed | Feb. 3, 1969 |
| [45] | Patented | May 11, 1971 |
| | | Continuation-in-part of application Ser. No. 423,203, Jan. 4, 1965, now abandoned. |

[54] MECHANICAL SEAL INSERTS
16 Claims, 11 Drawing Figs.

[52] U.S. Cl. ..................................................... 277/81
[51] Int. Cl. ............................................... F16j 15/16
[50] Field of Search ............................................ 277/1, 39, 81, 81 (S), 81 (R), 92, 107, 108, 216

[56] References Cited
UNITED STATES PATENTS

| 2,348,293 | 5/1944 | Hamer | 277/81UX |
| 2,806,720 | 9/1957 | Meyer | 277/92X |
| 2,832,653 | 4/1958 | Wilson | 277/107UX |
| 2,926,940 | 3/1960 | Maass | 277/81(S)UX |
| 2,989,966 | 6/1961 | Marshall | 277/81X |
| 3,025,070 | 3/1962 | Copes | 277/39 |
| 3,228,102 | 1/1966 | Sillett | 277/81UX |
| 3,235,274 | 2/1966 | Cain, Jr. et al. | 277/81(S)UX |

FOREIGN PATENTS

| 1,176,688 | 8/1964 | Germany | 277/81S |

*Primary Examiner*—Laverne D. Geiger
*Assistant Examiner*—Edward J. Earls
*Attorney*—William E. Ford ABSTRACT: Split critically tapered inserts adapted for relatively rotatable in radial face-to-face contact to form a sealing surface when one is carried in a stationary member as the hub part of a frame, and the other carried by a holder on the shaft. Special critically dimensioned grooves convey pressurized fluid to the inserts which act through the effective radial component of area thus provided, easily to eject the inserts. The inserts have contact rings of specially hardened, more expensive material bonded therein to be ground and lapped for final finish contact in rotation.

Patented May 11, 1971

JOHN C. COPES
INVENTOR

BY Wm. E. Ford
ATTORNEY

Patented May 11, 1971 3,578,345

JOHN C. COPES
INVENTOR.

BY Wm. E. Ford
ATTORNEY

MECHANICAL SEAL INSERTS

This invention relates to mechanical seal rings and their inserts and to methods of constructing the seal rings and inserts and to method of removing the inserts, the inserts being carried in mechanical seal parts and comprising the sealing element which come together in relatively rotatable, face-to-face sealing contact, one insert or sealing element being carried in a rotating seal part and the other insert or sealing element has been carried in a stationary seal part. A typical usage of such inserts being disclosed in U.S. Pat. No. 2,996,319 and in U.S. Pat. No. 3,025,070 by the applicant herein this application being a continuation-in-part application of application Ser. No. 423,203, filed Jan. 4, 1965 now abandoned.

As a primary object, this invention sets out to provide a more reliable and positive way of removing tapered split seal inserts, as from split mechanical seal rings or parts.

Also, the invention has, as an important object, the providing of an improved and more efficient and less expensive method of manufacturing tapered split seal inserts.

Additionally an important object of the invention comprises providing methods of removing tapered split seal inserts with a minimum expenditure of effort and with a minimum loss of time.

As a further object the invention provides methods of removing tapered split seal inserts in such manner that the vertical component of the seal ring groove area through which a hydraulic pressure acts to remove a split seal insert of predetermined area is a measure of the pressure applied by the hydraulic fluid to force the insert from the rotating or stationary part.

It is also an object of this invention to provide methods of removing tapered split seal inserts in which the groove in the seal ring or part carrying the insert may be removed by injecting pressurized hydraulic fluid through a radial hole in the seal ring or part.

Also a primary object of the part of the invention added by this application, is to provide method of and structure for providing tapered split seal inserts of the class hereinabove described which may have specially hardened contact rings of more expensive material bonded therein to be ground and lapped for final finish contact relative rotation therebetween.

Another and important object of the part of the invention added by this application is to provide inserts constructed as immediately hereinabove described which permit the grinding and lapping of the contact ring faces in the final processes of putting inserts of the class described into face-to-face contact upon relative rotation therebetween.

Other and further objects will be apparent when the specification herein is considered in connection with the drawings, in which:

FIG. 1 is a side elevational view, part in section, showing a rotated seal ring or part carrying a tapered split seal insert which seals during rotation in face-to-face contact with a corresponding opposed insert; in this view rotation has been stopped and a pressurized fitting installed in a radial tapped hole provided in the seal ring or part to communicate with an annular groove in the part into which pressurized hydraulic fluid from the fitting may be injected to unseat it;

FIG. 2 is a side elevational view, part in section, showing the stationary part opposing the rotated seal ring or part shown in FIG. 1, a radial tapped hole being provided in the part to receive a pressurized fitting through which pressurized hydraulic fluid may be injected to communicate with an annular groove provided in the respective seal ring or part to urge against the tapered split seal insert to unseat it;

FIG. 3 is a side elevational view, part in section, showing the seal ring or rotating part of two relatively rotated parts carrying a tapered split seal insert which seals during rotation in face-to-face contact; a radial tapped hole being provided in the seal ring or part to receive a pressurized fitting through which pressurized fluid may be injected to communicate with an annular groove provided in the seal ring or part to urge against the resilient but tough coating of the tapered split seal insert to unseat it;

FIG. 4 is a side elevational view, part in section, showing a stationary part or seal ring opposing the rotated parts or seal ring shown in FIG. 3, a radial tapped hole being provided in the seal ring or part to receive a grease fitting through which a pressurized hydraulic fluid may be injected to communicate with an annular groove provided in the part to urge against the split seal insert to unseat it;

Figures 1, 2:
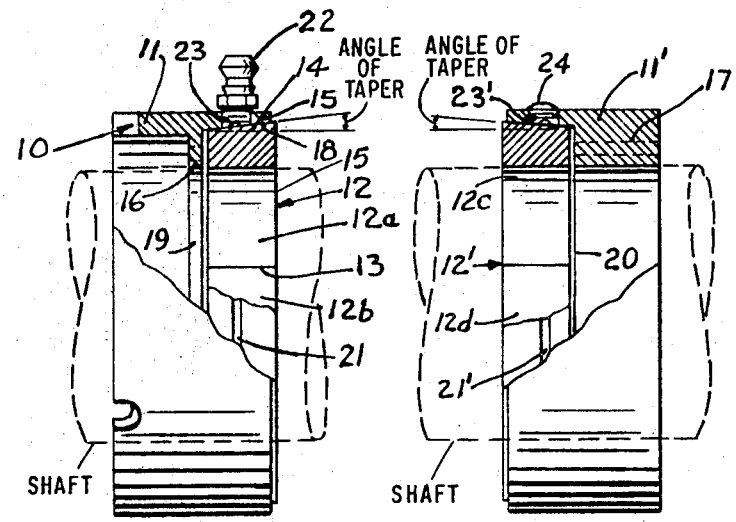

Referring now in detail to the drawings in which like reference numerals are assigned to like elements in the various views, a seal ring and insert assembly 10 is shown in FIG. 1 comprised of a metallic seal ring, insert holder or insert retainer 11, forming one of the elements about a shaft, not shown, such seal ring and insert assembly being part of the assembly of a mechanical seal such as shown in the above cited patents of the applicant in which one seal ring and the tapered split seal insert carried thereby rotate with a shaft whereas the other seal ring and the tapered split seal insert carried thereby are stationarily disposed as in a journal member in which such shaft rotates, such stationary seal ring being so disposed in assembly as to place the large diameter end of the insert carried thereby in face-to-face sealing contact with the large diameter end of the insert carried by the rotated seal ring.

It is thus not necessary to show the other elements of a mechanical seal assembly with relation to the seal rings herein but rather the seal rings need only be shown with relation to the inserts carried thereby.

Thus in FIG. 1 the assembly 10 of ring and insert, discloses a ring 11 having an inner tapered surface 14 into which an insert 12 has been forced, such insert comprising two insert sections 12a and 12b formed by splitting the insert 12, preferably along irregular lines 13, will be described herein below.

The insert shown in FIG. 1 has its outer periphery 18 tapered at the same taper (preferably about 5°) as the inner taper 14 of the seal ring 11. Also, the length or longitudinal extent of the insert is precalculated in connection with its outer diameter dimensions to permit the insert 12 to be wedged into the seal ring 11 so that approximately one thirty-second inch thereof projects out beyond the end face 15 of the seal ring. When thus wedged in place the inserts fit so tightly that substantial force and effort is normally required to remove it.

Also, conventionally, inserts are removed by providing knockout holes 16 and 17 in the inwardly extending flange 19 of the rotated seal ring 11, and through the inner face 20 of the seal ring 11' shown in FIG. 2 so that a punch may be inserted to remove the inserts 12 and 12' by punching them out. However, this is not a very efficient manner to accomplish insert removal, since the punch has to be driven in axial direction and there is not enough axial space for such an operation.

In this invention better removal can be affected by providing an annular groove 21 in the inner tapered periphery 14 of the seal ring 11. If this annular groove is located positively with relation to the outer end 15 of the seal ring 11, and if the outer end of the insert 12 bears a definitely known distance from the end 15 of the seal ring, with the degree of taper known, it is possible to calculate the total area of frictional contact between the inner surface of the seal ring 11 and the horizontal component of the groove area. The difference is the equivalent annular surface against which there is friction. By accurate calculations with a 5° taper, in the arrangement of FIG. 1 or FIG. 2, and for a 2 inch nominal shaft size, the equivalent inner diameter and outer diameter of the equivalent or mean radial annulus being respectively 2.191 inches and 2.201 inches, whereby the area of the mean radial annulus is 0.0378 square inches, approximately, where groove width is approximately one-sixteenth inch.

Also, in the foregoing example, the total area of frictional contact between the insert and seal ring can be calculated, as such is the area of a frustoconical section of approximately 3.101 square inches; also, the ration of 0.038/3.101, or slightly more than 1 percent may be established as an effective workable guide for establishing the angle of taper or for calculating the effective radial annulus. The above factors are predicated on approximately 500 pounds per square inch pressure being used to inject hydraulic fluid by way of a grease fitting 22 into a tapped bore 23 through the seal ring 11 to communicate with the groove 21.

Naturally, if the pressure is increased, there will be required a lesser effective annular area against which the vertical component of the hydraulic fluid needs to act. For practicality one thirty-second inch may be set as a minimum limit for groove width. Thus the groove effective vertical annular area component may be stated to have its best effect when it is no less than one-half of 1 percent of the total frictional area and when it is not greater than 2 percent of the total frictional area aforesaid.

Whereas one-eight inch or 25 percent of insert vertical length may be set as upper range for groove width, it may be understood that impractical considerations of expense and a great reduction of contact area would result should there be much greater widening of the groove width.

There should be no difference in the requirements of the seal ring 11' shown in FIG. 2 than for the seal ring 11 shown in FIG. 1, the faces of insert sections 12c and 12d of the inert 12' being frictionally borne upon by the faces of insert sections 12a and 12b of the insert 12 during the course of rotation.

For purposes of illustration a plug 24 is shown in FIG. 2 as being installed in a tapped bore 23' in the seal ring 11', the tapped bore 23' communicating with a groove 21' which extends annularly within the inner periphery of the seal ring 11' to carry hydraulic pressure fluid against the tapered frictional surface area of the insert 12', obviously the plug 24 would have to be removed and an Alemite grease fitting installed with the tapped bore 23' so that fluid might be injected to unseat the insert 12'.

Figures 3, 4:
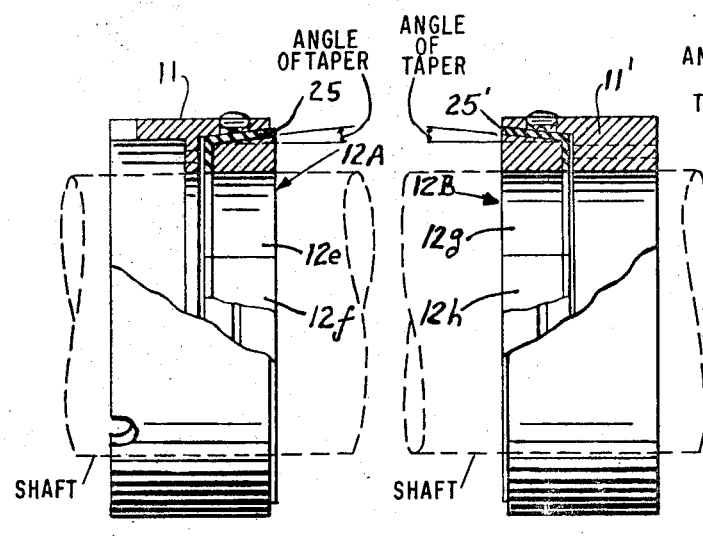

As shown in FIGS. 3 and 4, structures corresponding respectively to the seal ring 11 and the seal ring 11' are designated as the inserts 12A and 12B. Such inserts are shown as having the two split insert parts 12e, 12f and the two split insert parts 12g, and 12h, respectively. The inserts 12e and 12f differ in construction from the inserts shown and described hereinabove in that each has a resilient jacket 25 and 25' which is split along with the sections 12e, 12f, 12g and 12h which the jacket surrounds. In this case the coefficient of friction may be changed between the jackets and the seal rings, but as indicated by the reference numerals, the other parts are constructed similarly and the methods of removal are the same.

Figure 5:
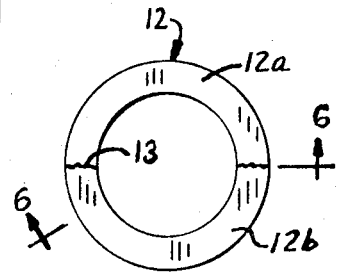
FIG. 5 is a front elevation of an insert showing lines along which it is broken to become a tapered split seal insert.
Figure 6:
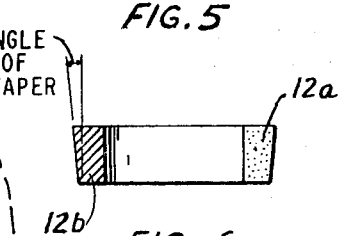
FIG. 6 is a transverse sectional view taken along line 6–6 of FIG. 5.

As shown in FIGS. 5 and 6 an insert 12 having insert parts 12a and 12b is shown cut along broken lines 13 which is accomplished by holding half of the insert 12 in a vise and breaking it by a sharp blow to obtain the two insert sections 12a and 12b as divided along broken or irregular lines. Such inserts 12a and 12b are processed from a semifinished ring, of smaller inner diameter and larger outer diameter and thickness. The ring is broken in the middle, as held in the vise, and the jagged edges will act as positioning peaks and valleys, thus compensating for dowels. The broken halves are assembled and the outside surfaces are machined to finish dimensions, and the finished halves are then match-marked so that respective halves are not interchangeable.

Advantage obtained by these broken surfaces resides in the fact that less leakage can take place through an extent of matched broken surfaces than can take place through lapped surfaces. Additionally, since the split does not have to be machined, less machining is required and the labor cost is lowered.

Figures 7, 8:
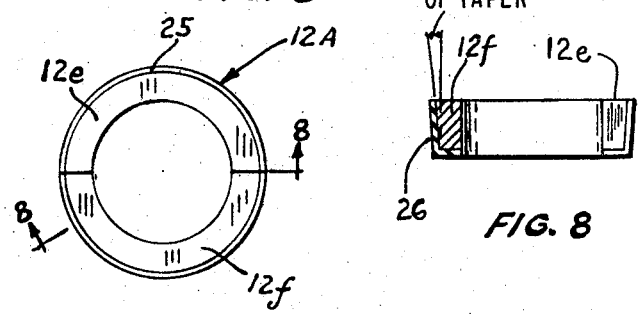
FIG. 7 is a front elevational view of a tapered split seal insert of the type shown in FIG. 3 wherein the inserts are contained by resilient liner members.
FIG. 8 is a transverse sectional view taken along line 8–8 of FIG. 7.

As shown in FIGS. 7 and 8, the insert 12A is jacketed by a resilient material 25 to obtain the jacketed inserts 12e and 12f, such coefficients of friction thereby obtained being the coefficients of friction obtainable by the relative rotational contact of plastic or rubber against metal.

As shown in phantom lines in FIG. 1, a "liquid" O-ring is provided by installing a fitting corresponding with the fitting 22, as shown to the right, in a tapped hole 27, also shown in phantom lines, through the wall of the seal ring 11 to the left of the flange 19. Then, a plastic, as a polytetrafluoroethylene compound, sold under the trademark Teflon, in fluid state, is inserted through the fitting to harden into a ring 26, thereby eliminating the necessity of replacing conventional O-rings or other packings at this point. This "liquid" O-ring 26 will seal between the seal ring 11 and shaft 28, and any conventional parts, not shown, which may bear to the left of the flange 19.

Figure 9:
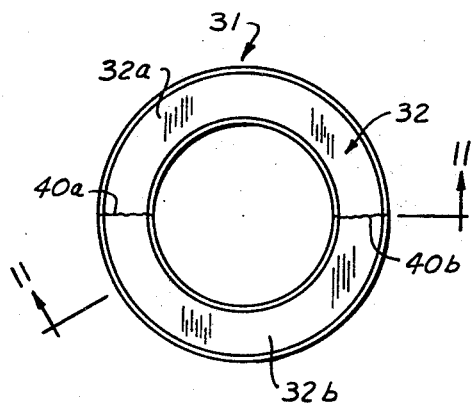
FIG. 9 is a plan view of an insert which comprises a variation of the inserts shown in FIGS. 1—8, including a lapped special alloy ring bonded to a similar tensile strength backing material body.

Referring now to the part of the invention added as new by this application, an insert 31 is shown in FIG. 9 which comprises a variation of the inserts shown in FIGS. 1—8, inclusive, the insert 31 differing from those aforesaid in that it provides a specially hardened ring 32 embedded in, or bonded to the body material 33 of the insert 31. Such a ring 32 may be of a hardened alloy material, as specially hardened tungsten steel, while the backing plate or body 33 supports the ring 32 may be of cast iron; epoxy resin 38, FIG. 11, being indicated as the material for effectuating the bond.

Figure 10:
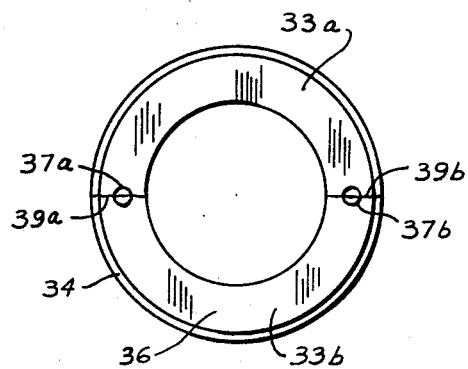
FIG. 10 is a bottom view of the insert shown in plan view in FIG. 9.
Figure 11:
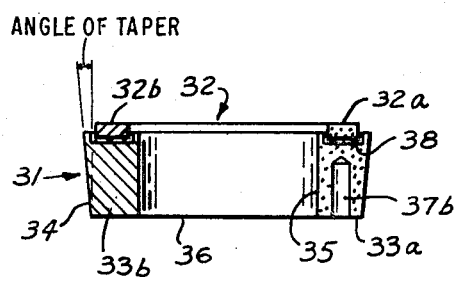
FIG. 11 is a sectional elevational view taken along line 11–11 of FIG. 10.

As shown in FIG. 10, the flat under side 36 of the insert 31 has two opposed holes 37a, 37b drilled upwardly therethrough and into the backing member or body material 33 to a depth indicated by the drilled hole 37b, FIG. 11. In order to fracture an insert 31 into two parts 31a, 31b, for ease of installation, as aforesaid, the insert 31 is scribed with a lathe tool to control lines of fracture 39a, 39b as shown in FIG. 10, and also the hardened ring 32 is scribed on each side by a diamond point tool, as along scribe lines 40a, 40b, FIG. 9.

Then the insert 31 is placed in a fixture with surface 36 upwardly, scribes 40a, 40b, on a knife edge. Then areas of greatest downward pressure is applied to insert areas approximately 90° on each of a line through the drilled holes 37a, 37b. Also tapered pins are inserted and urged downwardly into the drilled holes 37a, 37b, until fracture occurs substantially along the scribe lines hereinabove described. Thus the two insert half-sections, 32a, 33a and 32b, 33b may be interfitted and the outer surfaces of the body portions 32a, 32b tapered, as will be hereinbelow described.

As best shown in FIG. 11, the outer surface 34 of the insert 31 is tapered in correspondence with the taper of the holders 11, (FIGS. 1 and 3), or the holders 11', FIGS. 2 and 4. On the other hand, the opening through the insert body 33 comprises a straight cylindrical bore 35 in correspondence with the cylindrical bores through the inserts 11, 11' aforesaid.

Then the completed insert sections 32a, 33a and 32b, 33b may be assembled around the shaft or whatever the seal is to surround, and installed in holder 11 (FIGS. 1 and 3) or 11' (FIGS. 2 and 4), and finally the surface of the specially hardened ring assembly 32a, 32b may be ground or lapped for operative contact with the corresponding opposing member of its opposite member unit.

The invention is set forth in general principles in the forms now described with this application being completed by the exemplary claims appended herewith.

I claim:

1. The combination of a seal ring rotatable with a shaft and having a flange extending radially inwardly toward said shaft and a surface extending substantially longitudinally and tapered outwardly from said flange, a split insert tapered to be press-fitted into said seal ring tapered surface and to fit around said shaft, and an annular groove provided in said seal ring tapered surface to communicate substantially centrally of said insert tapered surface and of cross-sectional dimension to provide an effective radially extending annular area in direction of unseating thrust, and of radial width equal to groove width times the tangent of the angle of taper.

2. The combination as claimed in claim 1 in which said radial annulus is an area between 0.005 and 0.02 in ratio to the total frictional surface contact area between the insert and the seal ring.

3. The combination as claimed in claim 1 in which said radially extending annular area is substantially 1 percent of the total frictional surface contact area between the insert and the seal ring.

4. The combination as claimed in claim 1 in which the split in said insert is irregular along opposed, generally longitudinally extending lines of cleavage.

5. The combination as claimed in claim 1, in which said split insert includes a split ring of specially hardened material bonded in the larger diameter end face thereof.

6. The combination as claimed in claim 1, in which said split ring is comprised of tungsten carbide.

7. The combination of a stationary insert retainer with a shaft rotatable therein, said retainer including a countersunk end to provide a tapered surface to receive a split insert tapered to be press-fitted thereinto to fit around said shaft, and an annular groove provided in said stationary insert retainer tapered surface substantially centrally of said insert tapered surface and of cross-sectional dimension to provide an effective radially extending annular area in direction of unseating thrust, and of radial width equal to groove width times the tangent of the angle of taper.

8. The combination as claimed in claim 7 in which said radially extending annular area is between 0.005 and 0.02 in ratio to the total frictional surface contact area between the insert and the seal ring.

9. The combination as claimed in claim 7, in which said radially extending annular area is substantially 1 percent of the total frictional surface contact area between the insert and the seal ring.

10. The combination as claimed in claim 7 in which the tapered surface and shorter radial surface of said split insert are lined with a resilient material.

11. The combination as claimed in claim 7 in which the split in said insert is irregular along opposed, generally longitudinally extending lines of cleavage.

12. The combination as claimed in claim 7, in which said split insert includes a split ring or specially hardened material bonded in the larger diameter end face thereof.

13. The combination as claimed in claim 7 in which said split ring is comprised of tungsten carbide.

14. The combination of a holder with a shaft rotatable therein, said holder including a countersunk end to provide a tapered surface to receive a split insert tapered to be press-fitted thereinto to fit around said shaft, and an annular groove provided in said stationary insert holder tapered surface substantially centrally of said insert tapered surface and of cross-sectional dimension to provide an effective radially extending annular area in direction of unseating thrust, and of radial width equal to groove width times the tangent of the angle of taper.

15. The combination as claimed in claim 14, in which said split insert includes a split ring of specially hardened material bonded in the larger diameter end face thereof.

16. The combination as claimed in claim 14 in which said split-ring is comprised of tungsten carbide.